(No Model.) 2 Sheets—Sheet 1.
C. KIMPLEN.
DESICCATING MACHINE.
No. 246,616. Patented Sept. 6, 1881.
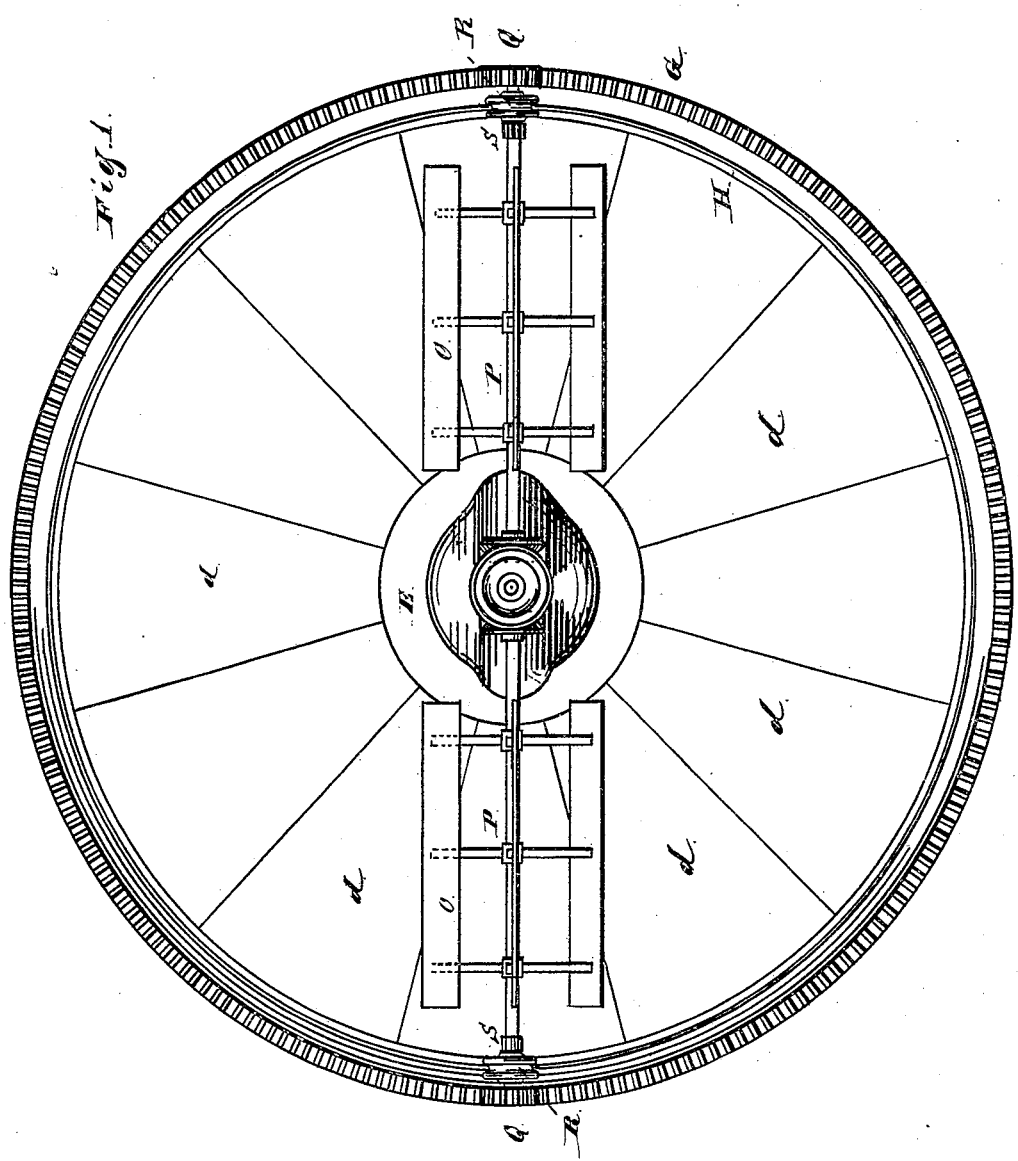
Witnesses:
Albert H. Adams
O. W. Bond
Inventor
Cornelius Kimplen.
By West & Bond Attys.

(No Model.) 2 Sheets—Sheet 2.
C. KIMPLEN.
DESICCATING MACHINE.
No. 246,616. Patented Sept. 6, 1881.
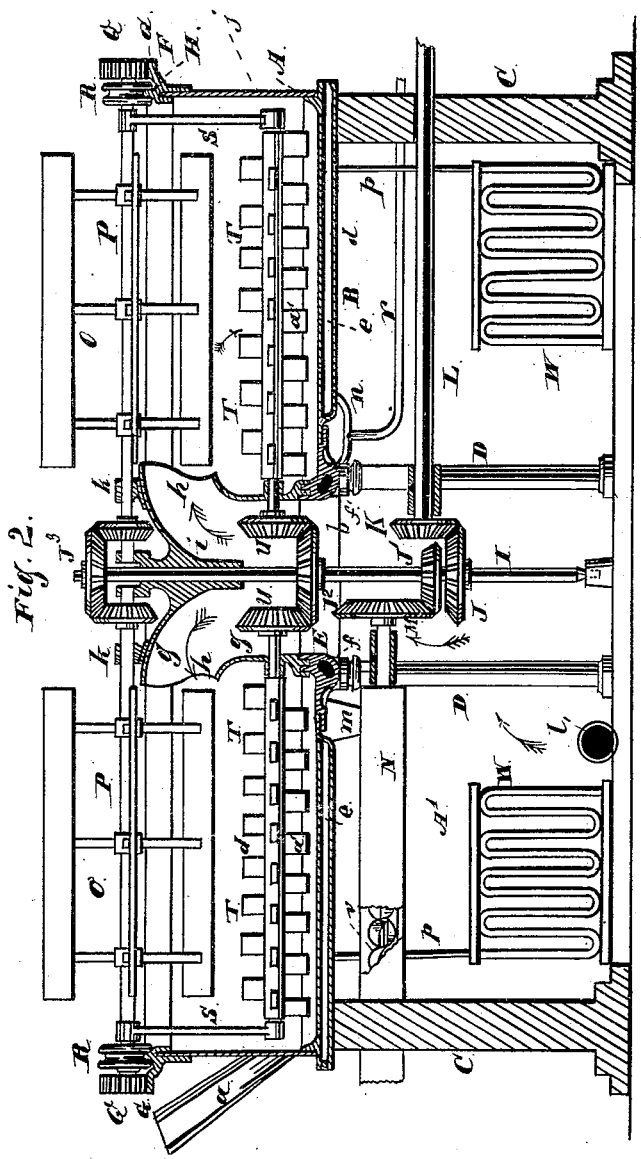
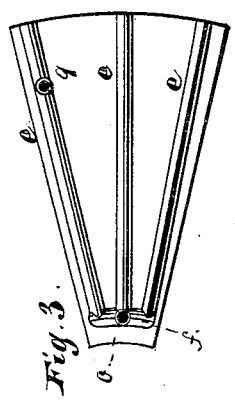
Witnesses:
Albert H. Adams.
O. W. Bond.
Inventor:
Cornelius Kimplen
By West & Bond
Attys.

UNITED STATES PATENT OFFICE.

CORNELIUS KIMPLEN, OF CHICAGO, ILLINOIS.

DESICCATING-MACHINE.

SPECIFICATION forming part of Letters Patent No. 246,616, dated September 6, 1881.

Application filed June 3, 1881. (No model.)

*To all whom it may concern:*

Be it known that I, CORNELIUS KIMPLEN, residing at Chicago, in the county of Cook and State of Illinois, and a citizen of the United States, have invented new and useful Improvements in Desiccating-Machines, of which the following is a full description, reference being had to the accompanying drawings, in which—

Figure 1 is a top view. Fig. 2 is a central vertical section; Fig. 3, a detail.

The object of my invention is to provide improved devices for drying fertilizing material and other things.

It consists in a series of rotating and revolving stirrers to agitate the material, combined with revolving and rotating reels or fans for agitating the air in said receptacle; in a warm-air chamber located beneath the said drying receptacle, from which heated air is conveyed into the said receptacle, and in passages leading from said air-chamber to the receptacle for the material, which passages discharge the air between the rotating stirrers and the fans, and in devices for operating the several parts, all as hereinafter fully described.

In the drawings, A represents a circular receptacle, into which the material to be dried is to be fed through a spout, a, or in other suitable manner.

B is the main part of the bottom of the receptacle A. This bottom, as shown, rests upon a circular wall, C, and is formed in sections d, the under side of one of which is shown in Fig. 3, and, as shown, each section is provided with three passages, e, closed at the ends.

E is a circular annular piece resting upon posts D, and the inner ends of the sections d are secured to this piece E, which does not cover the space between the posts D. The inner portion of E is thickened, and has a passage, f, extending around within it, and its upper edge is provided with a groove, as shown in Fig. 2, into which groove fits a circular piece, g, which forms the inner wall of the receptacle A, and also the wall of an air-passage, b. This piece g is carried up, as shown in the drawings, forming two passages, h, for air; and the central portion of the upper part of g is formed as shown at i.

j is the outer wall of the receptacle A, secured to the top of which is a rim, F, having upon its top a series of cogs, G, and also a track, H.

I is a shaft. The lower end rests in a bearing, and that part of g marked i forms a bearing for the upper end of this shaft.

J J' J² J³ are bevel-cog wheels on the shaft I, which is driven by the wheel K on the shaft L.

M is a bevel-wheel on a conveyer-shaft, which conveyer v is in the case N.

O O are two revolving fans.

P are the fan-shafts. On the outer end of each of these shafts is a cog-wheel, Q, which engages with the cogs G. The inner end of each shaft P is supported, as shown, in two bearings, k, which are connected with the upper portion of g. On each shaft P is a grooved wheel, R, which travels on the track H. There are bevel-cog wheels on the inner end of each shaft P, to which motion is given by the wheel J³.

S S are two hangers, one on each of the shafts P, which shafts revolve in the upper ends of these hangers.

T T are revolving and rotating stirrers, the shafts of which are supported at one end in the lower end of the hangers S, and the other end of each is supported in a bearing secured to the wall of the passage g. The shafts of the stirrers T have bevel-wheels U, which are driven by the wheel J². Below the receptacle A is an air-chamber, A', in which is located a series of heating-coils W. Cold air is forced into this chamber at opening l, or any other suitable point. I arrange this inlet so that the cold air will be thrown upon some of the coils.

m is a passage from the receptacle A, through which the dried material is delivered to the conveyers v.

n is a tube which connects the passage f in the ring E with one of the passages e in the bottom of the receptacle A, o, Fig. 3, being an opening with which the tube n is connected.

p are tubes, each leading from one of the passages e to one of the coils W, q, Fig. 3, being an opening with which the upper end of one of the tubes p is connected.

r is a pipe through which steam is supplied to heat the bottom of the receptacle A. The steam passes into one of the small tubes n, and will go into the passage f and into all the passages e, and will pass out through the pipes p to the coils W, heating both the bottom B and the coils W, by which the air forced into the chamber A' will be heated.

The operation is as follows: Steam to heat the bottom of the drying chamber or receptacle A is to be supplied through the pipes r, as before stated. Material to be dried is to be admitted at any suitable speed to the receptacle A through a spout, a, or otherwise. Motion is to be given to the shafts of the stirrers T, fans O, and conveyer v through the shaft I and wheels mentioned and shown, causing the fans and stirrers to rotate on their axes. At the same time the rotation of the shafts P will give motion to the cog-wheels Q, which are engaged with the cogs G upon the top of the outer wall, j, of the receptacle A, and hence the fans will not only revolve on their axes, but will also be carried around within the receptacle A, rotating in the plane of their axes. The stirrers T will also be carried around in the receptacle A. The part g rotates in the groove in the top of E with the fans and stirrers. Warm air from the chamber A' will pass through the passage b and passages h into the receptacle A, and will be deflected downward toward the bottom of A by the form of the passages h. At the same time the fans will have a tendency to drive this air downward and then take it out from the receptacle A, so that a current of warm air will be constantly brought into contact with the material being dried, and will rapidly take up and carry off the moisture therein. The material will be rapidly dried by the combined action of the heated bottom of the receptacle A, the action of the stirrers and fans, and by the constant current of warm air.

I regulate the delivery of material into the receptacle A in such a manner that when it reaches the delivery-spout m it will be sufficiently dry. The dried material will be delivered by the conveyer v outside of the wall C.

I have shown the bottom of the receptacle A provided with tubes or passage e for steam, and find that the same works well in practice. Instead of this construction, however, the bottom might be made double.

The track H and grooved wheels R serve the purpose of supporting the outer ends of the fan-shafts and keeping them in place while rotated by the wheels Q engaging with the cogs G. Instead of the track H shown and grooved wheel R, a flat track and flat wheel could be used, in which case it would be desirable to place a fixed collar on the shaft P, suitably located to prevent the shaft from getting out of place.

The bottom of the receptacle A is to be made of metal. A single bottom not adapted to receive steam would serve a useful purpose in connection with the hot-air chamber A' below it.

The receptacle A might be partially covered, if desired.

What I claim as new, and desire to secure by Letters Patent, is as follows:

1. The combination of a receptacle, A, revolving and rotating stirrers T, and revolving and rotating fans O, substantially as and for the purposes specified.

2. The combination of the receptacle A, having passages e, an air-chamber, A', below such receptacle, and heating-coils W, connected with the passages in the bottom of A by pipes p, substantially as and for the purposes specified.

3. The combination of the receptacle A, air-chamber A', and air-passages b and h, leading from the chamber A' to the receptacle A, substantially as and for the purpose specified.

4. The receptacle A, provided at its top with cogs G, and a track, H, in combination with the fan-shafts P, mounted as described, and provided with cog-wheels Q and loose wheels R, whereby, in connection with suitable mechanism, the fans can be made to rotate in the plane of their axes, substantially as and for the purpose specified.

5. A receptacle, A, having a metal bottom, and annular central piece, E, provided with a passage, f, in combination with the part g, resting upon the top of the piece E, and provided with bearings k k for the shafts P, and with a central bearing, i, for the upright shaft I, substantially as and for the purposes specified.

6. A receptacle, A, having passages e in its bottom, and an annular central piece, E, provided with a passage, f, in combination with one or more connecting-pipes, n, inlet steam-pipe r, and one or more outlet-pipes, p, leading to coils W in the air-chamber A', substantially as and for the purpose specified.

CORNELIUS KIMPLEN.

Witnesses:
E. A. WEST,
A. H. ADAMS.